(12) United States Patent
Wakao et al.

(10) Patent No.: US 7,535,488 B2
(45) Date of Patent: May 19, 2009

(54) IMAGE DATA VERIFICATION SYSTEM

(75) Inventors: Satoru Wakao, Tokyo (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 09/987,832

(22) Filed: Nov. 16, 2001

(65) Prior Publication Data
US 2002/0060736 A1 May 23, 2002

(30) Foreign Application Priority Data
Nov. 17, 2000 (JP) ............................. 2000-351529
Nov. 12, 2001 (JP) ............................. 2001-346689

(51) Int. Cl.
H04N 5/225 (2006.01)
H04N 7/167 (2006.01)
H04L 9/00 (2006.01)

(52) U.S. Cl. ............................. 348/207.1; 348/207.99; 380/202; 713/170

(58) Field of Classification Search .............. 348/207.1, 348/222.1, 211.3, 211.6, 211.12, 207.99; 380/202, 200, 246, 247, 52, 201; 713/170, 713/178, 193, 179
See application file for complete search history.

(56) References Cited

U.S. PATENT DOCUMENTS

| | | | |
|---|---|---|---|
| 5,499,294 A * | 3/1996 | Friedman | ................... 713/179 |
| 5,600,720 A | 2/1997 | Iwamura et al. | |
| 5,666,419 A | 9/1997 | Yamamoto et al. | |
| 5,875,249 A | 2/1999 | Mintzer et al. | |
| 5,898,779 A | 4/1999 | Squilla et al. | |
| 5,937,395 A | 8/1999 | Iwamura | |
| 6,064,764 A | 5/2000 | Bhaskaran et al. | |
| 6,088,454 A | 7/2000 | Nagashima et al. | |

(Continued)

FOREIGN PATENT DOCUMENTS

EP       0 952 728 A       10/1999

(Continued)

OTHER PUBLICATIONS

"Digital Image Recording for Court-Related Purposes" Rieger, et al., Proceedings 33rd Annual International Carnahan Conference on Security, Madrid, Spain, Oct. 5-7, 1999, pp. 262-268.

(Continued)

Primary Examiner—David L Ometz
Assistant Examiner—Luong T Nguyen
(74) Attorney, Agent, or Firm—Fitzpatrick, Cella, Harper & Scinto

(57) ABSTRACT

An image verification system has an image generation device and a first image verification device. The image generation device includes (a) an image data generation unit that generates image data, and (b) a first verification data generation unit that generates first verification data from the image data using a common key in common key cryptography. The first image verification device includes (a) a first verification unit that verifies, using the image data, the first verification data and the common key, whether the image data is altered, and (b) a second verification data generation unit that generates second verification data from the image data using a private key in public key cryptography without editing the image data, if the first verification unit verifies that the image data is not altered.

26 Claims, 12 Drawing Sheets

U.S. PATENT DOCUMENTS

| | | | |
|---|---|---|---|
| 6,269,446 B1* | 7/2001 | Schumacher et al. | 713/176 |
| 6,332,193 B1* | 12/2001 | Glass et al. | 713/170 |
| 6,513,118 B1 | 1/2003 | Iwamura | |
| 6,587,949 B1* | 7/2003 | Steinberg | 713/193 |
| 6,642,956 B1* | 11/2003 | Safai | 348/222.1 |
| 6,769,061 B1* | 7/2004 | Ahern | 713/176 |
| 6,826,315 B1* | 11/2004 | Wickes | 382/305 |
| 6,829,367 B1 | 12/2004 | Toyokawa et al. | |
| 6,889,324 B1 | 5/2005 | Kanai et al. | |
| 6,968,058 B1* | 11/2005 | Kondoh et al. | 380/200 |
| 7,000,112 B1 | 2/2006 | Oishi | |
| 7,124,094 B1* | 10/2006 | Kobayashi et al. | 705/26 |
| 7,139,407 B2 | 11/2006 | Wakao | |
| 2001/0021251 A1 | 9/2001 | Kasai et al. | |
| 2003/0011684 A1 | 1/2003 | Narayanaswami et al. | |
| 2003/0097568 A1 | 5/2003 | Choi et al. | |
| 2003/0123699 A1 | 6/2003 | Wakao et al. | |
| 2003/0123701 A1 | 7/2003 | Dorrell et al. | |
| 2003/0126443 A1* | 7/2003 | Wakao | 713/176 |
| 2003/0126444 A1* | 7/2003 | Wakao et al. | 713/176 |
| 2004/0071311 A1 | 4/2004 | Choi et al. | |

FOREIGN PATENT DOCUMENTS

| | | |
|---|---|---|
| EP | 1 209 847 A | 5/2002 |
| FR | 2 772 530 A1 | 12/1997 |
| JP | 09-200730 | 7/1997 |
| JP | 9-200730 | 7/1997 |
| JP | 11-308564 | 11/1999 |
| JP | 2000-215379 | 8/2000 |
| JP | 2001-36856 | 2/2001 |
| JP | 2001-100632 | 4/2001 |

OTHER PUBLICATIONS

Rieger, B. et al., "Digital Image Recording for Court-related Purposes", 1999 Proceedings, IEEE 33rd Annual 1999 International Carnahan Conference on Security Technology, Madrid, Spain Oct. 5-7, 1999, pp. 262-279.

Witzke E.L., et al., "Key Management for Large Scale End-to-end Encryption", Proceedings, Institute of Electrical and Electronics Engineers 1993 International Carnahan Conference on Security Technology, Ottawa, Ont., Oct. 12, 1994, pp. 76-79.

Yeung et al. "An Invisible Watermarking Technique For Image Verification", IEEE, 1997, pp. 680-683.

Wong, Ping Wah, "A Public Key Watermark for Image Verification and Authentication", IEEE, 1998, pp. 455-459.

Kahng et al., "Watermarking Techniques for Intellectual Property Protection", DAC, Jun. 15-19, 1998, pp. 776-781.

Memon et al., "Protecting Digital Media Content", Communications of the ACM, Jul. 1998, pp. 35-43.

* cited by examiner

| SPECIFIC ID | SHARE INFORMATION Kc | SECRET INFORMATION Kc |
|---|---|---|
| 001 | 0x1111 | 0x2222 |
| 002 | ...... | ...... |
| ...... | ...... | ...... |

| SPECIFIC ID | PUBLIC INFORMATION Kp |
|---|---|
| 001 | 0x3333 |
| 002 | ...... |
| ...... | ...... |

IMAGE DATA VERIFICATION SYSTEM

BACKGROUND OF THE INVENTION

1. Field of the Invention

The present invention relates to an image data verification system for detecting an alteration in image data generated by an image generation device such as a digital camera.

2. Related Background Art

In recent years, digital cameras for storing an optical image of a subject by digitizing the optical image have commercially practical.

Although image data obtained by a digital camera can be easily imported to a personal computer, it also can be easily altered in the personal computer. Consequently, there is a problem that image data obtained by a digital camera is inferior to that of a film photo in reliability, and therefore, in admissibility of evidence. In view of such a circumstance, a digital camera system with a function of adding a digital signature to the image data obtained by the digital camera has been proposed in recent years. Conventional digital camera systems with a digital signature function are disclosed in U.S. Pat. No. 5,499,294, Japanese Patent Application Laid-Open No. 9-200730 and so on.

In order to generate a digital signature, the public key cryptography as the RSA encryption is typically used. However, the public key cryptography system such as the RSA encryption, which requires exponentiation and remainder calculation, can hardly realize a high speed processing, and requires a processing time hundreds or thousands times longer than that of the common key cryptography such as the DES. Therefore, there is a problem that it is quite difficult with the restricted calculation resource of the conventional digital camera to generate a digital signature. While there may be contemplated a method for allowing the digital signature to be generated easily by enhancing significantly the performance of the calculation resource of the conventional digital camera, this method is not preferred because the cost of the digital camera itself is significantly increased.

SUMMARY OF THE INVENTION

An object of the present invention is to solve the above-described problems.

Furthermore, the present invention aims to provide an image data verification system that prevents the cost of an image generation device such as a digital camera from being increased and can reliably determine whether image data obtained by the image generation device is altered or not.

According to one aspect of the present invention, an image verification system has an image generation device and a first image verification device. The image generation device includes (a) an image data generation unit that generates image data, and (b) a first verification data generation unit that generates first verification data from the image data using a common key in common key cryptography. The first image verification device includes (a) a first verification unit that verifies, using the image data, the first verification data and the common key, whether the image data is altered, and (b) a second verification data generation unit that generates second verification data from the image data using a private key in public key cryptography without editing the image data, if the first verification unit verifies that the image data is not altered.

According to another aspect of the present invention, an image verification system includes an image generation device, a first image verification device, and a connection device that is connected to the image generation device and the first image verification device. The image generation device includes (a) an image data generation unit that generates image data, and (b) a first verification data generation unit that generates first verification data from the image data using a common key in common key cryptography. The connection device provides the image data and the first verification data to the first image verification device, which includes, (a) a first verification unit that verifies, using the image data, the first verification data and the common key, whether the image data is altered, and (b) a second verification data generation unit that generates second verification data from the image data using a private key in public key cryptography without editing the image data, if the first verification unit verifies that the image data is not altered.

According to still another aspect of the present invention, an image verification device includes a verification unit that verifies, using image data, first verification data and a common key in common key cryptography, whether image data is altered. The image data and the first verification data are generated in an image generation device, and the first verification data is generated from the image data using the common key. The image verification device further includes a verification data generation unit that generates second verification data from the image data using a private key in public key cryptography without editing the image data, if the verification unit verifies that the image data is not altered.

According to yet another aspect of the present invention, an image verification method includes a step of verifying, using image data, first verification data and a common key in common key cryptography, whether image data is altered, the image data and the first verification data being generated in an image generation device, and the first verification data being generated from the image data using the common key. The method further includes a step of generating second verification data from the image data using a private key in public key cryptography without editing the image data, if it is verified in the verifying step that the image data is not altered.

Still other objects of the present invention, and the advantages thereof, will become fully apparent from the following detailed description of the embodiments.

DETAILED DESCRIPTION OF THE PREFERRED EMBODIMENTS

First Embodiment

Now, a preferred first embodiment of the present invention will be described with reference to the drawings.

Figure 12:
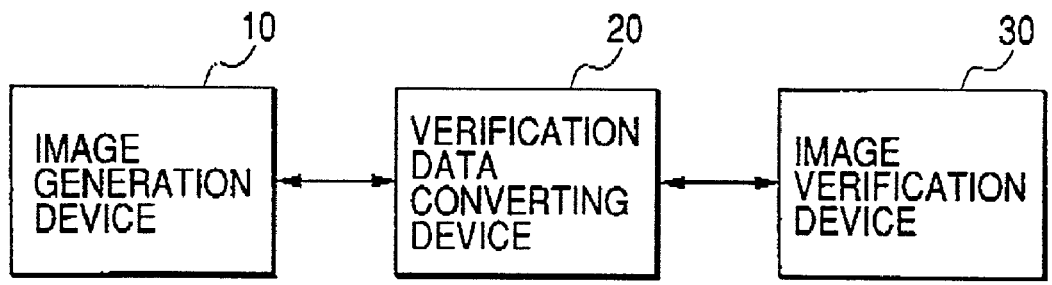
FIG. 12 is a diagram showing an example of a configuration of an image data verification system according to the first embodiment.

First, FIG. 12 is a diagram showing an example of a configuration of an image data verification system according to the first embodiment.

Reference numeral 10 denotes an image generation device that generates image data of a subject and primary verification data for verifying integrity of the image data, thereby generating an image file with primary verification data. Here, the image generation device 10 may be an image pickup device such as a digital camera, digital camcorder, or scanner, or may be electronic equipment with a function of obtaining image data of a subject.

Reference numeral 20 denotes a verification data converting device that verifies the integrity of the image data in the image file with primary verification data to determine whether the image data is altered or not. If the integrity of the image data is confirmed (that is, if the image data is not altered), the verification data converting device 20 generates secondary verification data (that is, digital signature) for verifying the integrity and validity of the image data and converts the image file with primary verification data into the image file with secondary verification data. Here, the verification data converting device 20 is a computer such as a personal computer.

Reference numeral 30 denotes an image verification device that verifies the integrity of the image data in the image file with secondary verification data and determines whether the image data of the file is altered or not. Here, the image verification device 30 is a server computer having the verification data converting device 20 as a client.

The medium connecting the image generation device 10 and verification data converting device 20 may be a transmission medium such as a LAN, IEEE1394-1995, or USB (Universal Serial Bus), or a removable medium (removable storage medium) such as a memory card. The medium connecting the verification data converting device 20 and image verification device 30 may be a public network such as the Internet, or a removable medium (removable storage medium) such as a memory card.

Figure 1:
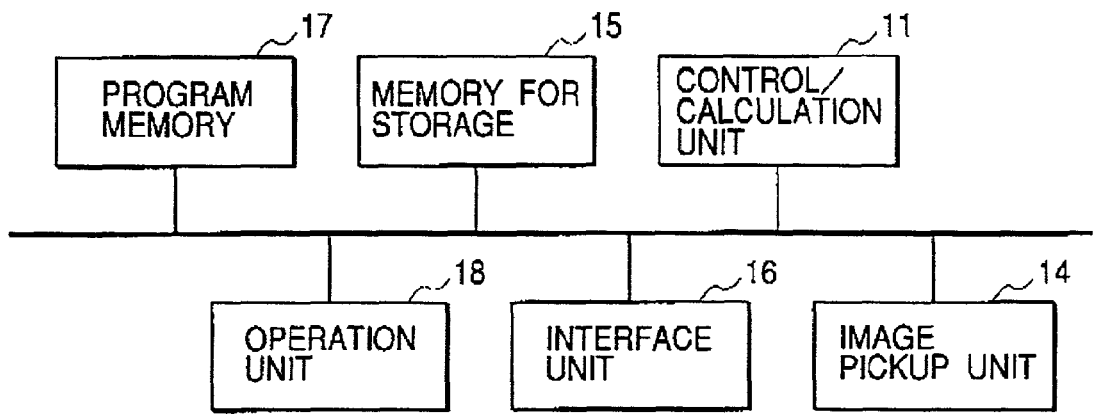
FIG. 1 is a block diagram showing an essential configuration of an image generation device 10 according to a first embodiment.

Next, a configuration of the image generation device 10 according to the first embodiment will be described. FIG. 1 is a block diagram showing an essential configuration of the image generation device 10 according to the first embodiment. In this drawing, each of the blocks represents a component having a specific function.

Reference numeral 11 denotes a control/calculation unit with a working memory and microcomputer. Reference numeral 14 denotes an image pickup unit including an optical sensor such as a charge coupled device (CCD). Reference numeral 15 denotes a save memory for storing the image file with primary verification data. Reference numeral 16 denotes an interface unit that transmits the image file with the primary verification data to the verification data converting device 20. Reference numeral 17 denotes a program memory. The program memory 17 stores a program for controlling a function of generating the image file with primary verification data. Besides, the program memory 17 stores common information Kc needed for generation of the primary verification data, which is equivalent to an encryption key of a common key cryptography, and a specific ID of the image generation device 10, which may be an identifier that allows the image generation device 10 to be uniquely identified, for example, a serial number. The program memory 17 may be a ROM or EEPROM. The information stored in the program memory 17, however, should be kept in confidence and prevented from being revealed. Reference numeral 18 denotes an operation unit that accepts various kinds of instructions (for example, start of shooting) from a user.

Figure 2:
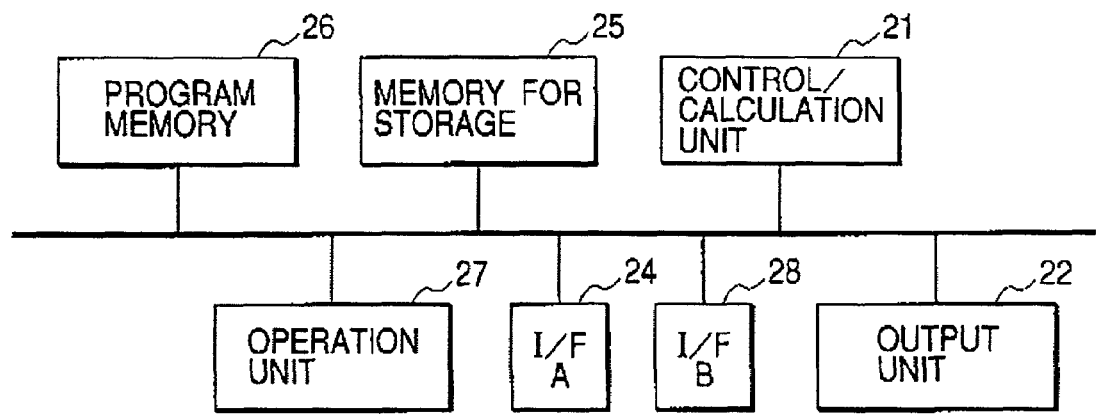
FIG. 2 is a block diagram showing an essential configuration of a verification data converting device 20 according to the first embodiment.

Next, a configuration of the verification data converting device 20 according to the first embodiment will be described. FIG. 2 is a block diagram showing an essential configuration of the verification data converting device 20 according to the first embodiment. In this drawing, each of the blocks represents a component having a specific function.

Figures 7A, 7B, 8:
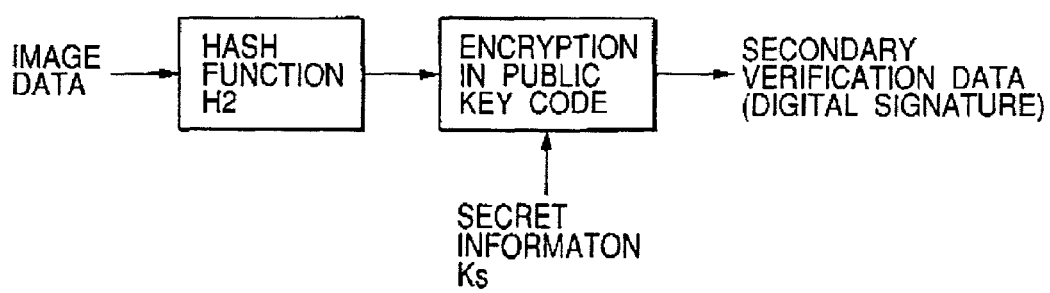
FIGS. 7A and 7B show examples of each of tables T1 and T2.
FIG. 8 is a diagram for illustrating a method for generating secondary verification data (that is, digital signature)

Reference numeral 21 denotes a control/calculation unit with a working memory and microcomputer. Reference numeral 24 denotes an interface unit A that receives the image file with primary verification data from the image generation device 10. Reference numeral 28 denotes an interface unit B that transmits the image file with the secondary verification data to the image verification device 30. Reference numeral 25 denotes a save memory for storing the image file with primary verification data and image file with secondary verification data. Reference numeral 26 denotes a program memory. The program memory 26 stores a program for controlling a function of verifying the integrity of the image file with primary verification data and a function of generating the image file with secondary verification data. Besides, the program memory 26 stores a table T1 including specific IDs of a plurality of image generation devices, a plurality of pieces of common information Kc corresponding to the respective specific IDs, each of which is equivalent to the decode key of the common key cryptography, and a plurality of pieces of secret information Ks corresponding to the respective IDs, each of which is equivalent to the secret key of the public key cryptography. An example of the table T1 is shown in FIG. 7A. The program memory 26 may be a ROM or EEPROM. The information stored in the program memory 26, however, should be kept in confidence and prevented from being revealed. Reference numeral 27 denotes an operation unit that accepts various kinds of instructions from a user. Reference numeral 22 denotes an output unit that outputs a message showing whether or not the image file with secondary verification data is altered to an external device such as a display unit or printer.

Figure 3:
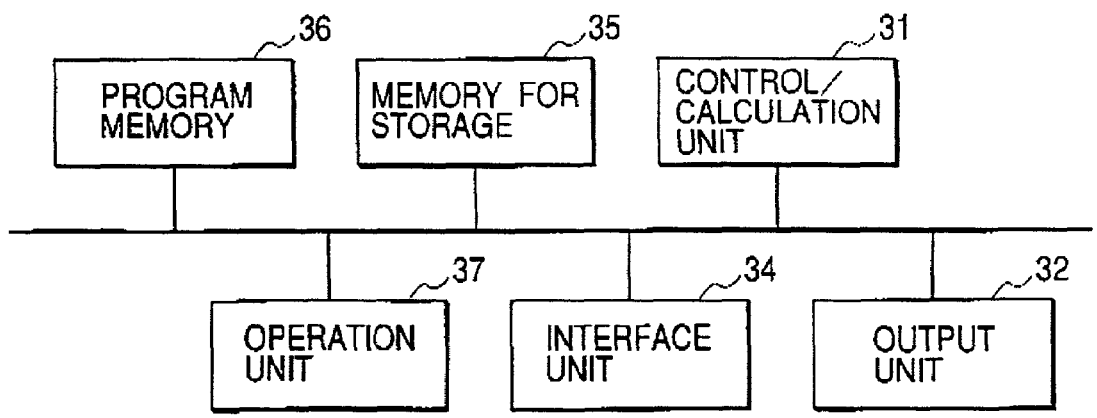
FIG. 3 is a block diagram showing an essential configuration of an image verification device 30 according to the first embodiment.

Next, a configuration of the image verification device 30 according to the first embodiment will be described. FIG. 3 is a block diagram showing an essential configuration of the image verification device 30 according to the first embodiment. In this drawing, each of the blocks represents a component hating a specific function.

Reference numeral 31 denotes a control/calculation unit with a working memory and microcomputer. Reference numeral 34 denotes an interface unit that receives the image file with secondary verification data and public information Kp needed for verification of the integrity of the image file with the secondary verification data. Reference numeral 36 denotes a program memory. The program memory 36 stores a program for controlling a function of verifying the integrity of the image file with secondary verification. Besides, the program memory 36 stores a table T2 including specific IDs of a plurality of image generation devices and a plurality of pieces of public information Kp corresponding to the respective IDs, each of which is equivalent to the public key of the public key cryptography. An example of the table T2 is shown in FIG. 7B. The program memory 36 may be a ROM or EEPROM. Reference numeral 37 denotes an operation unit that accepts various kinds of instructions from a user. Reference numeral 32 denotes an output unit that outputs a message showing whether or not the image file with secondary verification data is altered to an external device such as a display unit or printer. Reference numeral 35 denotes a save memory for storing the image file with secondary verification data. The save memory 35 serves also as a database having registered therein information including the presence of an alteration, location of the public information, specific ID information of the verification data converting device 20, registration date, and verification date.

Figure 4:
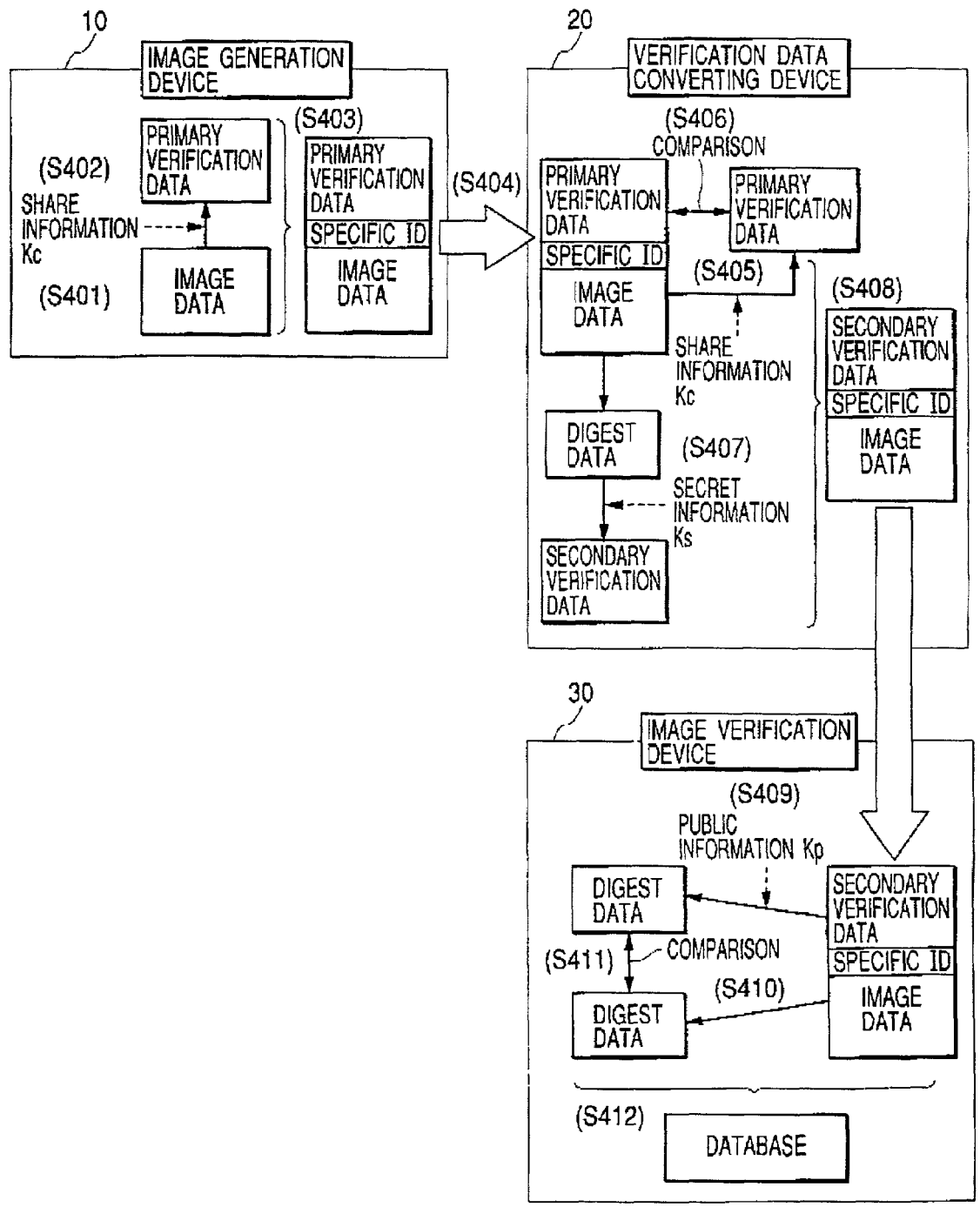
FIG. 4 is a diagram for illustrating a processing procedure of an image data verification system according to the first embodiment.

Next, a processing procedure of the image data verification system according to the first embodiment will be described. FIG. 4 is a diagram for illustrating the processing procedure of the image data verification system according to the first embodiment;

Step S401: The image generation device 10 generates image data of a subject according to the shooting instruction from a user, and creates an image file in accordance with a predetermined image file format from the generated image data. In this process, the image data is compressed and coded in a compression coding method in accordance with the predetermined file format. The predetermined file format may be JFIF (JPEG File Interchange Format), TIFF (Tagged Image File Format), GIF (Graphics Interchange Format), extended format thereof, or other image file format.

Step S402: the image generation device 10 generates primary verification data for the generated image data from the image data and shared information Kc.

Now, with reference to FIGS. 5A and 5B, an example of a method for generating the primary verification data will be described. The method for generating the primary verification data should not be disclosed to the public for security of the primary verification data and should be kept in confidence within the image generation device 10 and verification data converting device 20.

Figure 5A:
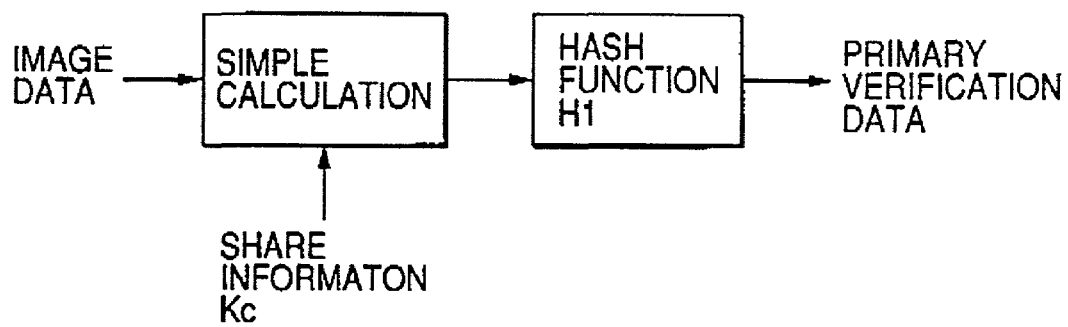
FIGS. 5A and 5B are diagrams for illustrating a method for generating primary verification data.

FIG. 5A is a diagram for illustrating a first method for generating the primary verification data. The first method shown in FIG. 5A is implemented according to the following sub-steps (a1) to (a3). Here, the method shown in FIG. 5A is implemented by the control/calculation unit 11 of the image generation device 10 and control/calculation unit 21 of the verification data converting device 20.

Figure 6:
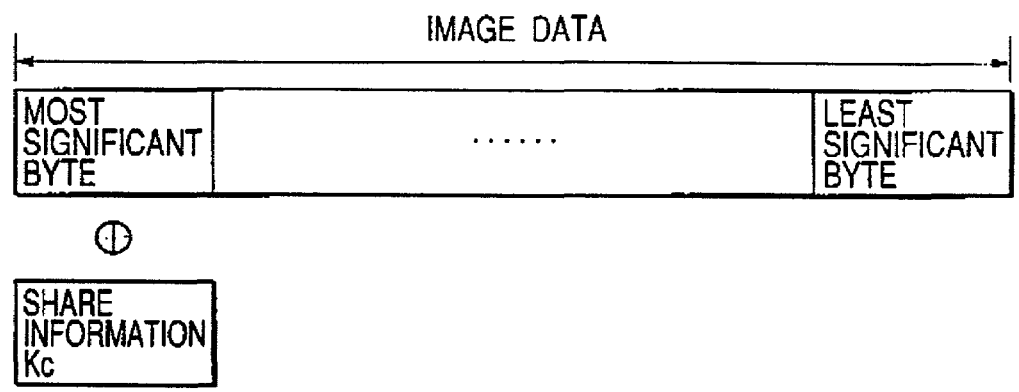
FIG. 6 is a diagram for illustrating an example of a simple calculation.

(a1) First, a simple calculation is performed to encrypt the image data with the shared information Kc. An example of the simple calculation is shown in FIG. 6. As shown in FIG. 6. in the first embodiment, the image data is encrypted by performing the exclusive OR calculation on the part of the image data (for example, most significant byte) and shared information Kc (for example, "11111111"). The simple calculation may be replaced with another calculation algorithm so far as it can be performed in a short time with the restricted calculation resource of the image generation device 10.

(a2) Then, the data obtained in the sub-step (a1) is converted into digest data (hash data) by a hash function H1. The hash function H1 may be MD-2, MD-4, MD-5, SHA-1, RIPEMD-128, RIPEMD-160, or other hash functions.

(a3) Finally, the digest data obtained in the sub-step (a2) is regarded as the primary verification data.

Figure 5B:
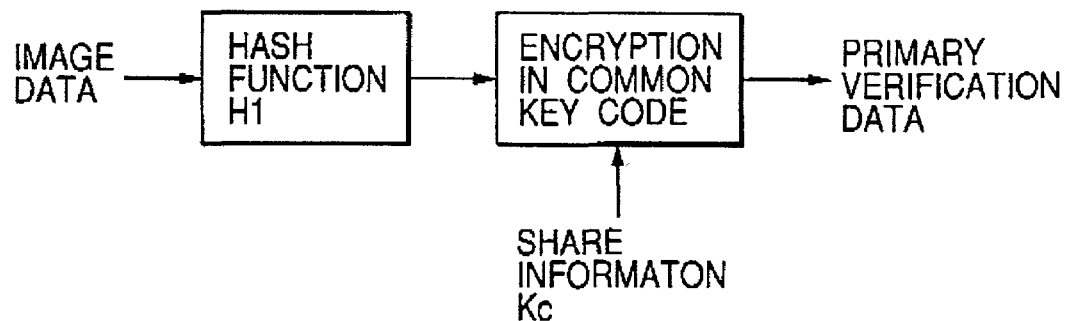

FIG. 5B is a diagram for illustrating a second method for generating the primary verification data. The second method shown in FIG. 5B is implemented according to the following sub-steps (b1) to (b3). Here, the second method shown in FIG. 5A is implemented by the control/calculation unit 11 of the image generation device 10 and control/calculation unit 21 of the verification data converting device 20.

(b1) First, the image data is converted into digest data (hash data) by the hash function H1. The hash function H1 may be MD-2, MD-4, MD-5, SHA-1, RIPEMD-128, RIPEMD-160, or other hash functions.

(b2) Then, the digest data is encrypted with the shared information Kc according to a predetermined common key cryptography. The predetermined common key cryptography may be DES, Rinjdael, or other common key cryptographies.

(b3) Finally, the digest data encrypted with the shared information Kc is regarded as the primary verification data.

Step S403: The image generation device 10 adds the generated primary verification data to the header portion of the image file to create the image file with primary verification data. In addition to the primary verification data, the image generation device 10 adds the specific ID information of the image generation device 10 to the header portion of the image file.

Step S404: The image generation device 10 transmits the image file with primary verification data to the verification data converting device 20.

Step 5405: Upon receiving the image file with primary verification data, the verification data converting device 20 extracts the primary verification data and specific ID of the image generation device 10 from the header portion of the file and the image data from the data portion of the file. Furthermore, the verification data converting device 20 detects the shared information Kc and secret information Ks corresponding to the extracted specific ID by referring to the table T1 in the program memory 26. In the case where the specific ID of the image generation device is "001", for example, the shared information Kc corresponding to the specific ID is "0x1111", and the secret information Ks corresponding to the specific ID is "0x2222". The verification data converting device 20 generates the primary verification data for the extracted image data from the image data and detected shared information Kc. Here, the verification data converting device 20 generates the primary verification data in the same manner as the image generation device 10.

Step S406: The verification data converting device 20 compares the primary verification data extracted from the image file with primary verification data (that is, primary verification data generated in the image generation device 10) with the primary verification data generated in step S405 (that is, primary verification data generated in the verification data converting device 20) to verify the integrity of the image data in the image file with primary verification data. If the image data is not altered from the transmission by the image generation device 10 until the reception by the verification data converting device 20, the two pieces of primary verification data coincide with each other. At this case, the verification data converting device 20 can reliably confirm that the image data is the image data that is generated in the image generation device 10 and that it is secure data which has not been altered. Further, in such a case, the verification data converting device 20 determines that the image data is not altered and begins to generate the secondary verification data for the image data. On the other hand, if the image data is altered from the transmission by the image generation device 10 until the reception by the verification data converting device 20, the two pieces of primary verification data don't coincide with each other. In such a case, the verification data converting device 20 determines that the image data is altered and informs a user (who takes a picture) via a message that the image data is altered. In such a case, furthermore, the verification data converting device 20 inhibits generation of the secondary verification data for the image data.

Step S407: in the case where it is determined that the image data is not altered, the verification data converting device 20 generates the secondary verification data (that is, digital signature) from the image data in the image file with primary verification data.

Now, with reference to FIG. 8, a method for generating the secondary verification data will be described. The method illustrated in FIG. 8 is implemented according to the following sub-steps (1) to (3). Here, the method illustrated in FIG. 8 is implemented by the control/calculation unit 21 of the verification data converting device 20 and control/calculation unit 31 of the image verification device 30.

(1) First, the image data is converted Into digest data (hash data) by a hash function H2. The hash function H2 may be any one of MD-2, MD-4, MD-5, SHA-1, RIPEMD-128, RIPEMD-160, or other hash functions.

(2) Then, the digest data is encrypted with the secret information Ks according to a predetermined public key cryptography. The predetermined public key cryptography may be RSA encryption or other public key cryptographies.

(3) Finally, the digest data encrypted with the secret information Ks is regarded as the secondary verification data (that is, digital signature).

Step S408: The verification data converting device 20 replaces the primary verification data in the header portion of the image file with the secondary verification data to create the image file with secondary verification data. The created image file with secondary verification data is output to a public network such as the Internet, or a removable medium (removable storage medium) such as a memory card. The image verification device 30 receives the image file with secondary verification data from the public network such as the Internet, or a removable medium (removable storage medium) such as a memory card.

Step S409: Upon receiving the image file with secondary verification data, the image verification device 30 extracts the secondary verification data and specific ID of the image generation device 10 from the header portion of the file. Furthermore, the image verification device 30 detects the public information Kp corresponding to the extracted specific ID by referring to the table T2 in the program memory 36. In the case where the specific ID of the image generation device 10 is "001", for example, the public information Kp corresponding to the specific ID is "0x1111", and the secret information Ks corresponding to the specific ID is "0x3333". The public information Kp may be obtained from a predetermined server. The image verification device 30 decodes the extracted secondary verification data with the public information Kp to restore the digest data (hash value). Here, the public information Kp corresponds to the secret information Ks kept in confidence by the verification data converting device 20 and is disclosed to the public.

Step S410: In addition, the image verification device 30 extracts the image data from the data portion of the image file with secondary verification data. The image verification device 30 converts the extracted image data into digest data (hash value) by the hash function H2. This hash function H2 is the same as the hash function H2 used in the verification data converting device 20.

Step S411: The image verification device 30 compares the digest data restored in step S409 with the digest data obtained in step S410 to verify the integrity and validity of the image data in the image file with secondary verification data. If the image data is not altered from the transmission by the verification data converting device 20 until the reception by the image verification device 30, the two pieces of digest data coincide with each other. In this case, the image verification device 30 can reliably confirm that the image data is the image data that is generated in the image generation device 10, and that the secondary verification data of the image data has be added by the primary verification device 20. Further, in such a case, the image verification device 30 determines that the image data is not altered and informs a user (verifier) of the determination result. On the other hand, if the image data is altered from the transmission by the verification data converting device 20 until the reception by the image verification device 30, the two pieces of digest data don't coincide with each other. In such a case, the image verification device 30 determines that the image data is altered and informs the user (verifier) of the determination result.

Step S412: Each time an alteration in the image file with secondary verification data is checked for, the image verification device 30 registers the information including the file name of the image file, registration date of the image file, verification date of the image file, presence or absence of an alteration, location of the public information Kp, specific ID information of the verification data converting device 20 into a database in the save memory 35. The registration of such information into the save memory allows the verifier to manage the verified image file with secondary verification data to be accomplished.

As described above, with the image data verification system according to the first embodiment, it is possible to reliably determine whether the image data generated by the image generation device 10 is altered or not without significantly enhancing the performance of the calculation resource of the image generation device 10.

In addition, with the image data verification system according to the first embodiment, it is possible to reduce the cost of the image generation device 10.

In addition, with the image data verification system according to the first embodiment, it is possible to reliably confirm whether or not the image data in the image file with primary verification data or the image data in the image file with secondary verification data is the image data generated in the image generation device 10.

In addition, with the image data verification system according to the first embodiment, it is possible to operate securely the whole system because the primary verification data ensures the security from the image generation device 10 to the verification data converting device 20, and the secondary verification data (that is, digital signature) ensures the security from the verification data converting device 20 to the image verification device 30.

Figure 9:
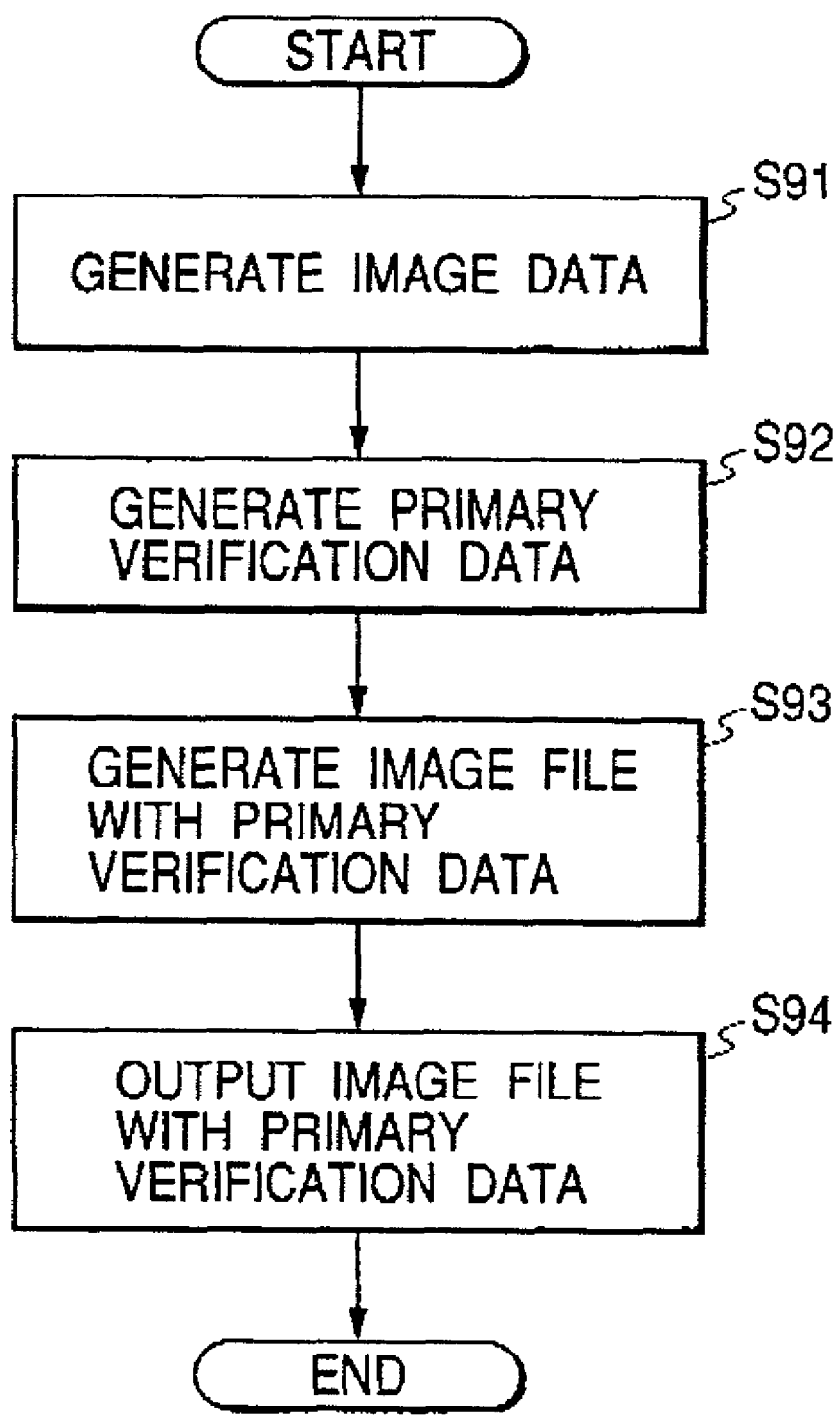
FIG. 9 is a flowchart showing a processing procedure of the image generation device 10 according to the first embodiment.

Next, with reference to FIG. 9, a processing procedure of the image generation device 10 according to the first embodiment will be described. The processing procedure shown in FIG. 9 is performed according to the program stored in the program memory 17. The processing procedure shown in FIG. 9 is performed each time image one piece of data is obtained.

Step S91: The image pickup unit 14 generates image data of a subject according to an instruction from a user. The control/calculation unit 11 creates an image file in accordance with a predetermined image file format from the image data generated by the image pickup unit 14.

Step S92: The control/calculation unit 11 generates primary verification data for the image data from the generated image data and common information Kc.

Step S93: The control/calculation unit 11 adds the generated primary verification data to the header portion of the image file to create an image file with primary verification data. In addition to the primary verification data, the control/calculation unit 11 adds the specific ID information (that is, specific ID) of the image generation device 10 to the header portion of the image file.

Step S94: The interface unit 16 transmits the image file with primary verification data to the outside.

By the processing procedure described above, each time one piece of image data is generated, the image generation device 10 can generate the primary verification data for the image data and combine the image data, the primary verification data and the specific ID of the image generation device 10 into one image file.

Figure 10:
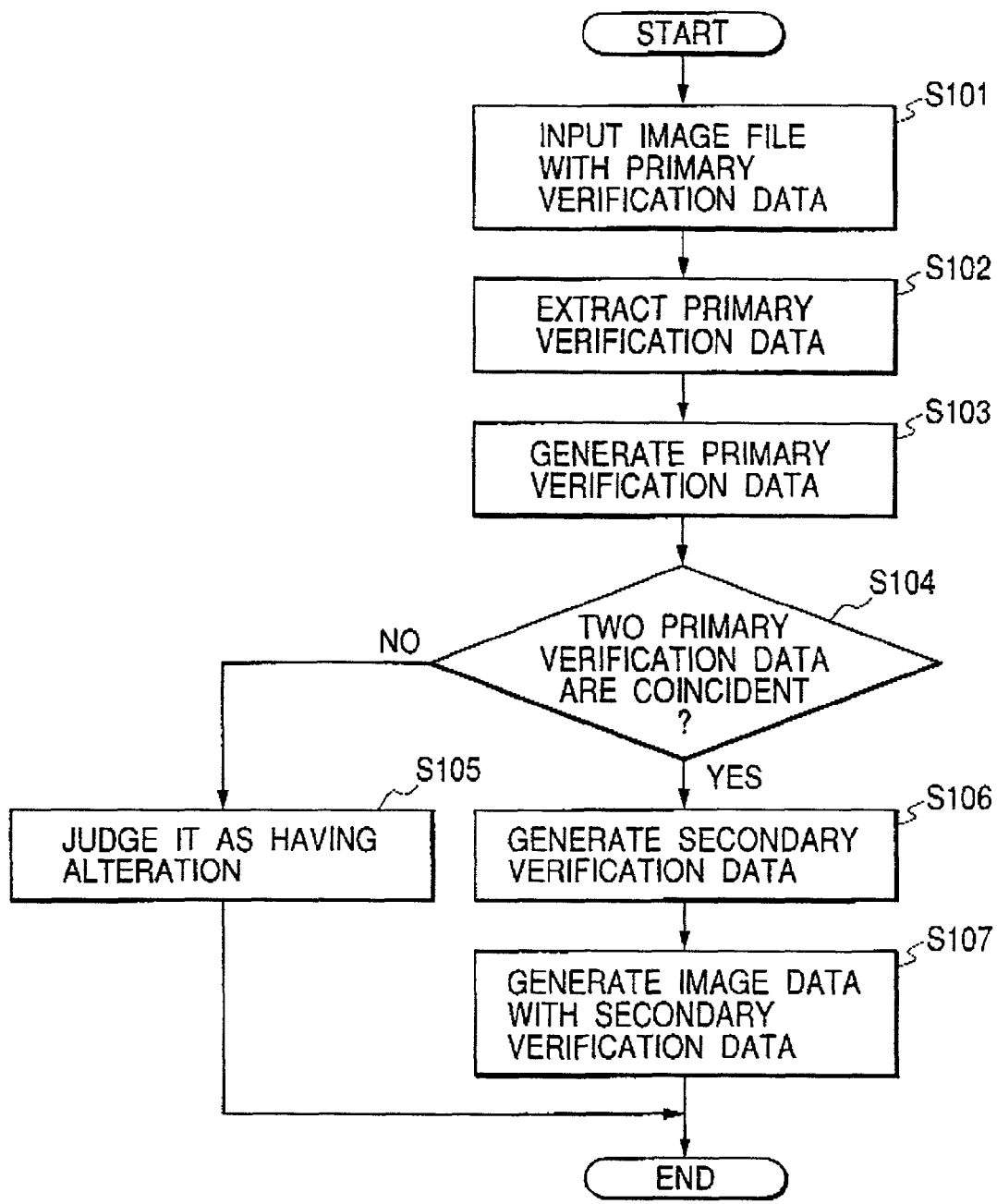
FIG. 10 is a flowchart showing a processing procedure of the verification data converting device 20 according to the first embodiment.

Next, with reference to FIG. 10, a processing procedure of the verification data converting device 20 according to the first embodiment will be described. The processing procedure shown in FIG. 10 is performed according to the program stored in the program memory 26. The processing procedure shown in FIG. 10 is performed each time the image file with primary verification data is received.

Step S101: The interface unit 24 receives the image file with primary verification data from the outside.

Step S102: The control/calculation unit 21 extracts the primary verification data from the header portion of the image file with primary verification data.

Step S103: In addition, the control/calculation unit 21 extracts the specific ID of the image generation device 10 from the header portion of the image file with primary verification data and image data from the data portion of the same file. The control/calculation unit 21 detects the shared information Kc and secret information Ks corresponding to the extracted specific ID by referring to the table T1 in the program memory 26. The control/calculation unit 21 generates the primary verification data for the extracted image data from the image data and detected shared information Kc.

Step S104: The primary verification data extracted in step S102 (that is, primary verification data generated in the image generation device 10) is compared with the primary verification data generated in step S103 (that is, primary verification data generated in the verification data converting device 20) to verify the integrity of the image data in the image file. If coincidence between two pieces of primary verification data is detected, the process continues to step S105. On the other hand, if coincidence between two pieces of primary verification data is not detected, the process continues to step Step S105: In this case, the control/calculation unit 21 determines that the image data is altered and informs a user (who takes a picture) via a message that the image data is altered. In this case, the image generation device 10 inhibits generation of the secondary verification data.

Step S106: In this case, the control/calculation unit 21 generates the secondary verification data (that is, digital signature) from the image data in the image file with primary verification data.

Step S107: The control/calculation unit 21 replaces the primary verification data in the header portion of the image file with the generated secondary verification data to create the image file with secondary verification data. The created image file with secondary verification data is output to a public network such as the Internet, or a removable medium (removable storage medium) such as a memory card.

Through the processing procedure described above, the verification data converting device 20 can reliably determine whether the image data generated by the image generation device 10 is altered or not without significantly enhancing the performance of the calculation resource of the image generation device 10. In addition, the verification data converting device 20 can reliably confirm whether or not the image data in the image file with primary verification data is the image data generated in the image generation device 10. In addition, once the integrity of the image file with primary verification data is confirmed, it also can convert the image file into the image file with secondary verification data (that is, image file with a digital signature).

Figure 11:
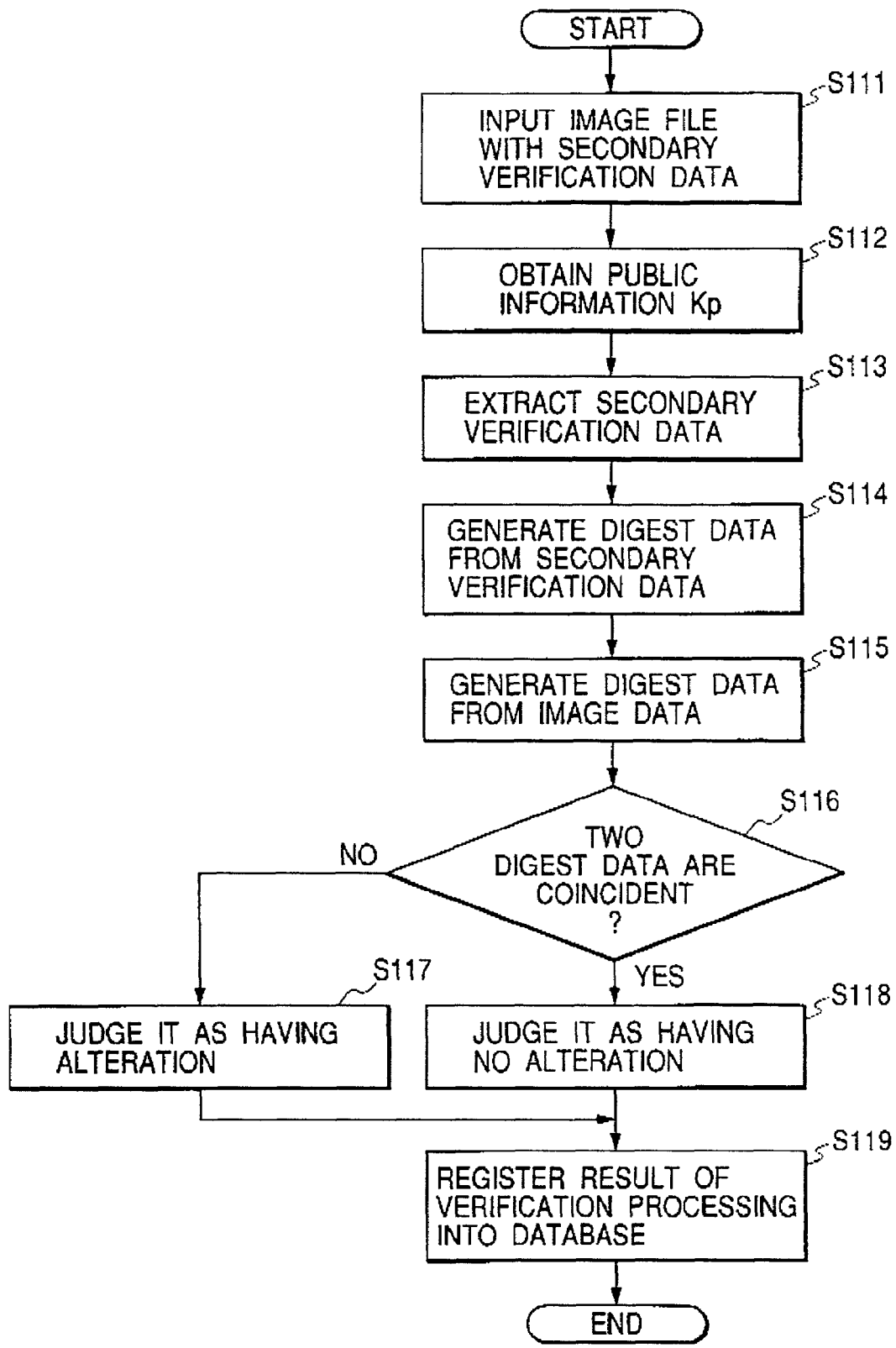
FIG. 11 is a flowchart showing a processing procedure of the image verification device 30 according to the first embodiment.

Next, with reference to the flowchart in FIG. 11, a processing procedure of the image verification device 30 according to the first embodiment will be described. The processing procedure shown in FIG. 11 is performed according to the program stored in the program memory 36. The processing procedure shown in FIG. 11 is performed each time the image file with secondary verification data is received.

Step S111: The interface unit 34 receives the image file with secondary verification data from the public network such as the Internet, or a removable medium (removable storage medium) such as a memory card.

Step S112: The image verification device 30 extracts the specific ID of the image generation device 10 from the header portion of the image file with secondary verification data. Furthermore, the image verification device 30 detects the public information Kp corresponding to the extracted specific ID by referring to the table T2 in the program memory 36. The public information Kp may be obtained from a predetermined server.

Step S113: The control/calculation unit 31 extracts the secondary verification data from the header portion of the image file with secondary verification data.

Step S114: The control/calculation unit 31 decodes the secondary verification data extracted in step S113 with the public information Kp to restore the digest data (hash value).

Step S115: The control/calculation unit 31 extracts the image data from the data portion of the image file with secondary verification data and converts the extracted image data into digest data (hash value) by the hash function H2.

Step S116: The control/calculation unit 31 compares the digest data restored in step S114 with the digest data obtained in step S115 to verify the integrity and the validity of the image data in the image file with secondary verification data. If coincidence between two pieces of digest data is detected, the process continues to step S117. On the other hand, if coincidence between two pieces of digest data is not detected, the process continues to step S118.

Step S117: In this case, the control/calculation unit 31 determines that the image data is altered and informs a user (verifier) via a message that the image data is altered.

Step S118: In this case, the control/calculation unit 31 determines that the image data is not altered and informs a user (verifier) via a message that the image data is not altered.

Step S119: The control/calculation unit 31 registers the information including the file name of the image file, registration date of the image file, verification date of the image file, presence or absence of an alteration, location of the public information Kp, specific ID information of the verification data converting device 20 into a database in the save memory 35.

Through the processing procedure described above, the image verification device 30 can reliably determine whether the image data generated by the image generation device 10 is altered or not. In addition, the image verification device 30 can reliably confirm whether or not the image data in the image file with secondary verification data is the image data generated in the image generation device 10.

As described above, with the image data verification system according to the first embodiment, it is possible to reliably determine whether the image data generated by the image generation device 10 is altered or not without significantly enhancing the performance of the calculation resource of the image generation device 10.

Second Embodiment

Now, a preferred second embodiment of the present invention will be described with reference to the drawings. In the second embodiment, a case where the verification data converting device 20 of the first embodiment is constituted by two data processors so that the security of the shared information Kc and secret information Ks is improved will be described.

Figure 13:
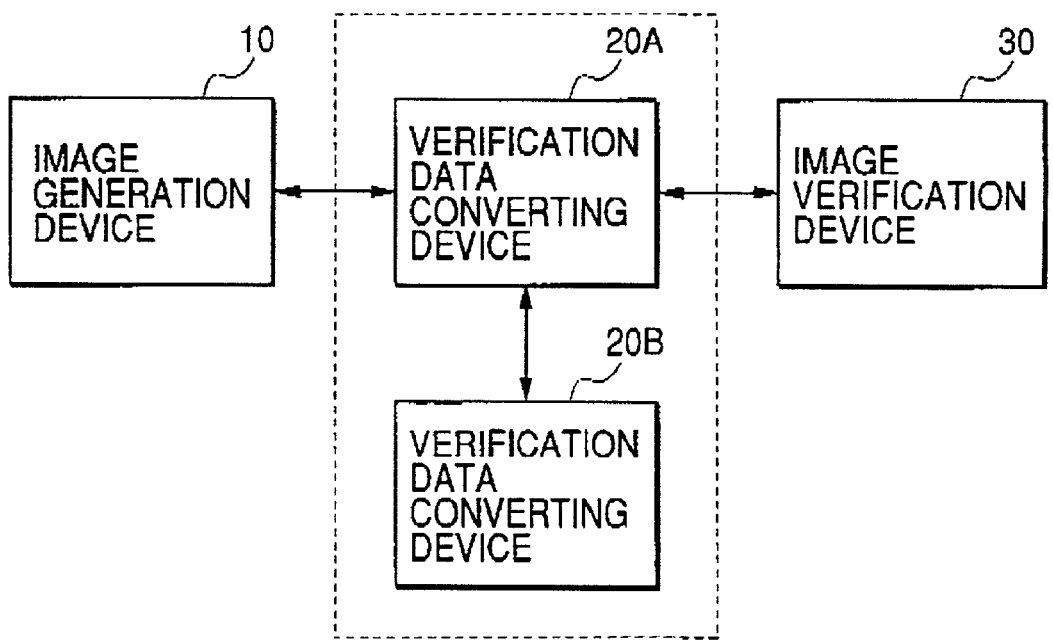
FIG. 13 is a diagram showing an example of a configuration of an image data verification system according to a second embodiment.

First, FIG. 13 is a diagram illustrating an example of a configuration of an image data verification system according to the first embodiment. The configuration of the image generation device 10 and image verification device 30, and the process procedure of them are the same as in the first embodiment, and therefore, description thereof will be omitted.

Reference numeral 20A denotes a first verification data converting device. Reference numeral 20B denotes a second verification data converting device that is robuster that the first verification data converting device 20A. The verification data converting device 20A transfers the image file with primary verification data received from the image generation device 10 to the verification data converting device 20B and informs a user (who takes a picture) of the verification result of the verification data converting device 20B. The verification data converting device 20B verifies the integrity of the image data in the image file with primary verification data to determine whether the image data is altered or not. If the integrity of the image data is confirmed (that is, if the image data is not altered), the verification data converting device 20B generates the secondary verification data for verifying the integrity and validity of the image data (that is, digital signature) and converts the image file with primary verification data into the image file with secondary verification data. In this regard, the verification data converting device 20A is a computer such as a personal computer. The verification data converting device 20B may be a storage medium with a microprocessor, such as an IC card, or a server computer having the verification data converting device 20A as a client computer. In the case where the verification data converting device 20A is a client and the verification data converting device 20B is a server, the connection between these devices may be a network, such as a LAN, WAN, or the Internet.

The medium connecting the image generation device 10 and verification data converting device 20A may be a transmission medium such as a LAN, IEEE1394-1995, or USB (Universal Serial Bus), or a removable medium (removable storage medium) such as a memory card. The medium connecting the verification data converting device 20A and image verification device 30 may be a public network such as the Internet, or a removable medium (removable storage medium) such as a memory card.

Figure 14:
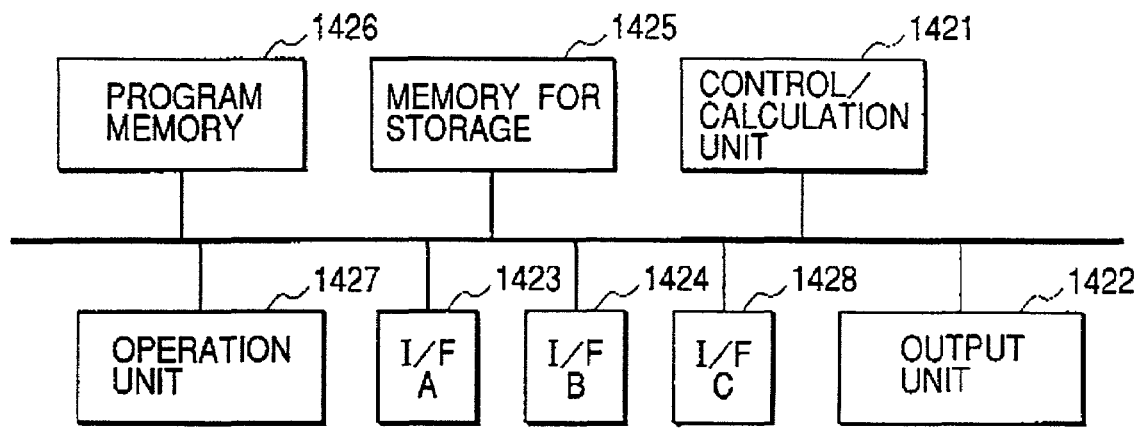
FIG. 14 is a block diagram showing an essential configuration of a first verification data converting device 20A according to the second embodiment.

Next, a configuration of the verification data converting device 20A according to the second embodiment will be described. FIG. 14 is a block diagram showing an essential configuration of the verification data converting device 20A according to the second embodiment. In this drawing, each of the blocks represents a component having a specific function.

Reference numeral 1421 denotes a control/calculation unit with a working memory and microcomputer. Reference numeral 1423 denotes an interface unit A that receives the image file with primary verification data from the image generation device 10. Reference numeral 1424 denotes an interface unit B that transmits the image file with primary verification data to the verification data converting device 20A and receives the image file with the secondary verification data from the verification data converting device 20A. Reference numeral 1428 denotes an interface unit C that transmits the image file with secondary verification data to the image verification device 30. Reference numeral 1425 denotes a save memory for storing the image file with primary verification data and image file with secondary verification data. Reference numeral 1426 denotes a program memory. The program memory 1426 stores a program for controlling a function of verifying the integrity of the image file with primary verification data. The program memory 1426 may be a ROM or EEPROM. Reference numeral 1427 denotes an operation unit that accepts various kinds of instructions from a user. Reference numeral 1422 denotes an output unit that outputs a message showing whether or not the image file with secondary verification data is altered to an external device such as a display unit or printer.

Figure 15:
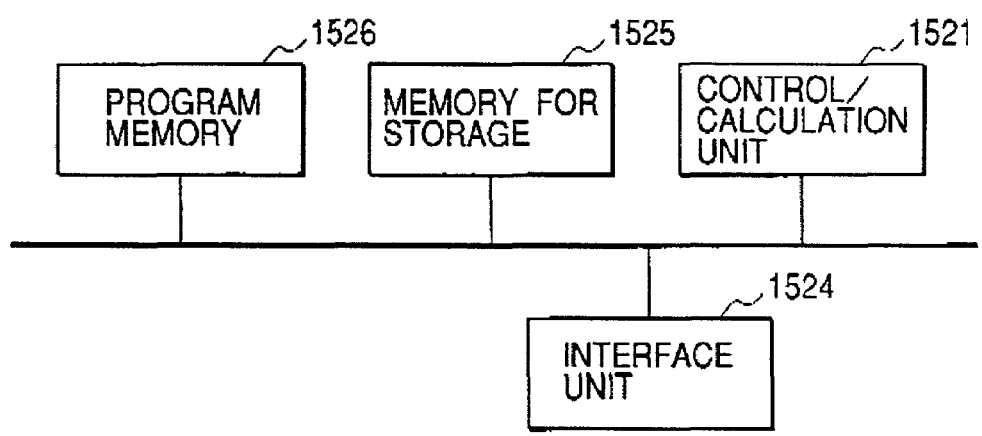
FIG. 15 is a block diagram showing an essential configuration of a second verification data converting device 20B according to the second embodiment.

Next, a configuration of the verification data converting device 20B according to the second embodiment will be described. FIG. 15 is a block diagram showing an essential configuration of the second verification data converting device according to the second embodiment. In this drawing, each of the blocks represents a component having a specific function.

Reference numeral 1521 denotes a control/calculation unit with a working memory and microcomputer. Reference numeral 1524 denotes an interface unit that receives the image file with primary verification data from the verification data converting device 20A and transmits the image file with the secondary verification data to the verification data converting device 20A. Reference numeral 1525 denotes a save memory for storing the image file with primary verification data and image file with secondary verification data. Reference numeral 1526 denotes a program memory. The program memory 1526 stores a program for controlling a function of generating the image file with secondary verification data. Besides, the program memory 1526 stores a table T1 including specific IDs of a plurality of image generation devices, a plurality of pieces of common information Kc corresponding to the respective specific IDs, each of which is equivalent to the decode key of the common key cryptography, and a plurality of pieces of secret information Ks corresponding to the respective IDs, each of which is equivalent to the secret key of the public key cryptography. An example of the table T1 is shown in FIG. 7A. The program memory 1526 may be a ROM or EEPROM. The information stored in the program memory 1526, however, should be kept in confidence and prevented from being revealed.

Figure 16:
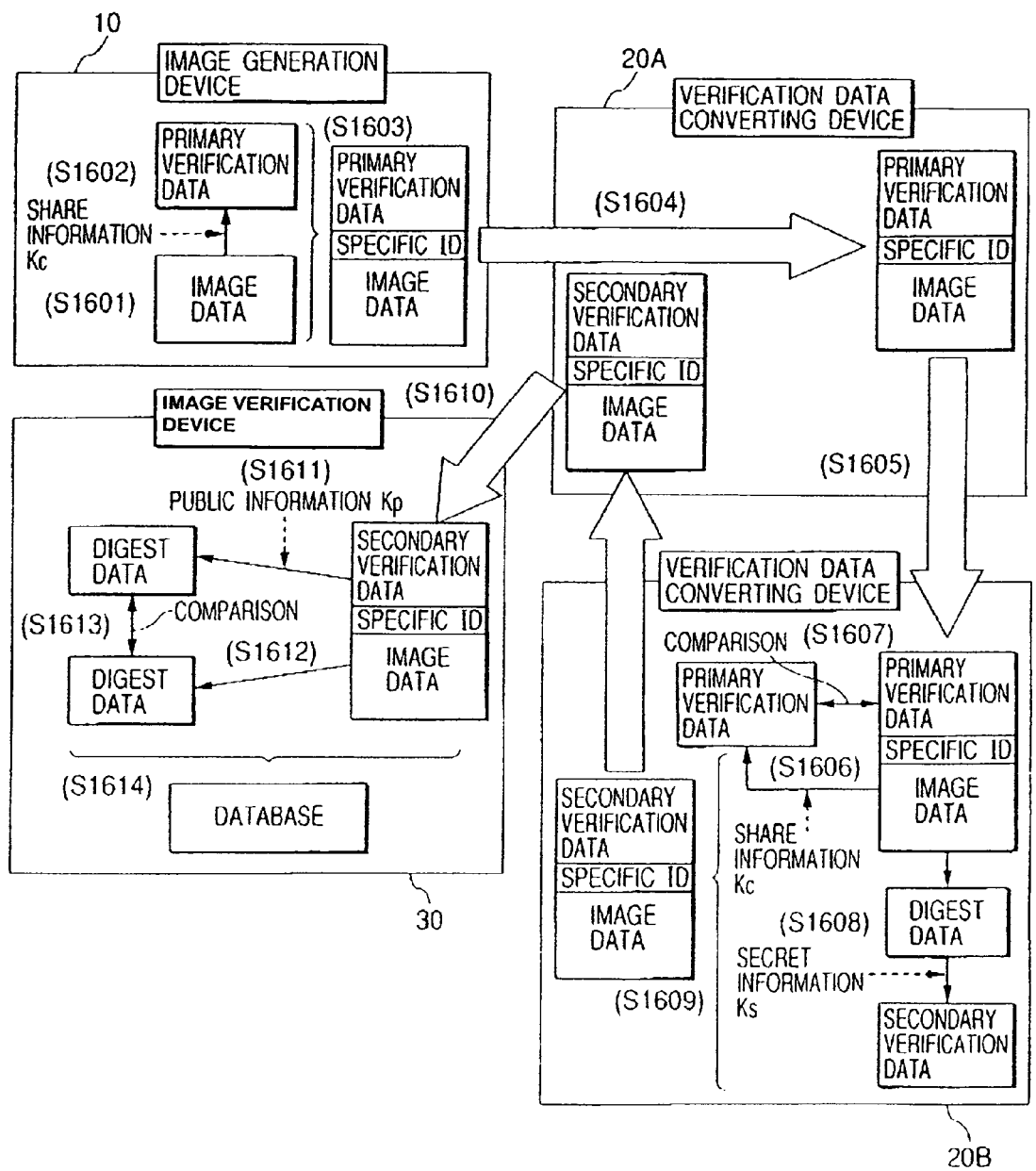
FIG. 16 is a diagram for illustrating a processing procedure of the image data verification system according to the second embodiment.

Next, a processing procedure of the image data verification system according to the second embodiment will be described. FIG. 16 is a diagram for illustrating the processing procedure of the image data verification system according to the second embodiment;

The processing procedure from step S1601 to step S1603 is the same as the processing procedure from step S401 to step S403 in the first embodiment, and therefore, description thereof will be omitted.

Step S1604: The image generation device 10 transmits the image file with primary verification data to the verification data converting device 20A.

Step S1605: The verification data converting device 20A transmits the image file with primary verification data to the verification data converting device 20B.

Step S1606: Upon receiving the image file with primary verification data, the verification data converting device 20B extracts the primary verification data and specific ID of the image generation device 10 from the header portion of the file and the image data from the data portion of the file. Furthermore, the verification data converting device 20B detects the shared information Kc and secret information Ks corresponding to the extracted specific ID by referring to the table T1 in the program memory 1526. In the case where the specific ID of the image generation device 10 is "001", for example, the shared information Kc corresponding to the specific ID is "0x1111", and the secret information Ks corresponding to the specific ID is "0x2222". The verification data converting device 20B generates the primary verification data for the extracted image data from the extracted image data and detected shared information Kc. Here, the verification data converting device 20B generates the primary verification data in the same manner as the image generation device 10.

Step S1607: The verification data converting device 20B compares the primary verification data extracted from the image file with primary verification data (that is, primary verification data generated in the image generation device 10) with the primary verification data generated in step S1606 (that is, primary verification data generated in the verification data converting device 20B) to verity the integrity of the image data in the image file with primary verification data. If the image data is not altered from the transmission by the image generation device 10 until the reception by the verification data converting device 20B, the two pieces of primary verification data coincide with each other. In this case, the verification data converting device 20B can reliably confirm that the image data is the image data generated in the image generation device 10, and that is secured image data that has not been altered. Further, in such a case, the verification data converting device 20B determines that the image data is not altered and begins to generate the secondary verification data for the image data. On the other hand, if the image data is altered from the transmission by the image generation device 10 until the reception by the verification data converting device 20B, the two pieces of primary verification data don't coincide with each other. In such a case, the verification data converting device 20B determines that the image data is altered and transmits a message showing that the image data is altered to the verification data converting device 20A. In such a case, the verification data converting device 20B inhibits generation of the secondary verification data for the image data.

Step S1608: In the case where it is determined that the image data is not altered, the verification data converting device 20B generates the secondary verification data (that is, digital signature) from the image data in the image file with primary verification data. The verification data converting device 20B generates the secondary verification data from the image data according to the method illustrated in FIG. 8.

Step S1609: The verification data converting device 20B replaces the primary verification data in the header portion of the image file with the generated secondary verification data to create the image file with secondary verification data. The created image file with secondary verification data is transmitted to the verification data converting device 20A.

Step S1610: The verification data converting device 20A outputs the image file with secondary verification data to a public network such as the Internet, or a removable medium (removable storage medium) such as a memory card. The image verification device 30 receives the image file with secondary verification data from the public network such as the Internet, or a removable medium (removable storage medium) such as a memory card.

Step S1611: Upon receiving the image file with secondary verification data, the image verification device 30 extracts the secondary verification data and specific ID of the image generation device 10 from the header portion of the file. Furthermore, the image verification device 30 detects the public information Kp corresponding to the extracted specific ID by referring to the table T2 in the program memory 36. In the case where the specific ID of the image generation device 10 is "001", for example, the public information Kp corresponding to the specific ID is "0x1111", and the secret information Ks corresponding to the specific ID is "0x3333". The public information Kp may be obtained from a predetermined server. The image verification device 30 decodes the extracted secondary verification data with the public information Kp to restore the digest data (hash value). Here, the public information Kp corresponds to the secret information Ks kept in confidence by the verification data converting device 20B and is disclosed to the public.

Step S1612: In addition, the image verification device 30 extracts the image data from the data portion of the image file with secondary verification data. The image verification device 30 converts the extracted image data into digest data (hash value) by the hash function H2. This hash function H2 is the same as the hash function H2 used in the verification data converting device 20B.

Step S1613: The image verification device 30 compares the digest data restored in step S1611 with the digest data obtained in step S1612 to verify the integrity and validity of the image data in the image file with secondary verification data. If the image data is not altered from the transmission by the verification data converting device 20B until the reception by the image verification device 30, the two pieces of digest data coincide with each other. In this case, the image verification device 30 can reliably confirm that the image data is the image data that is generated in the image generation device 10, and that the secondary verification data of the image data has been added by the verification data converting device 20B. In such a case, the image verification device 30 determines that the image data is not altered and informs a user (verifier) of the determination result. On the other hand, if the image data is altered from the transmission by the verification data converting device 20B until the reception by the image verification device 30, the two pieces of digest data don't coincide with each other. In such a case, the image verification device 30 determines that the image data is altered and informs the user (verifier) of the determination result.

Step S1614: Each time an alteration in the image file with secondary verification data is checked for, the image verification device 30 registers the information including the file name of the image file, registration date of the image file, verification date of the image file, presence or absence of an alteration, location of the public information Kp, specific ID information of the verification data converting device 20A into a database in the save memory 35. The registration of such information into the save memory allows the verifier to manage the verified image file with secondary verification data to be accomplished.

As described above, with the image data verification system according to the second embodiment, it is possible to reliably determine whether the image data generated by the image generation device 10 is altered or not without significantly enhancing the performance of the calculation resource of the image generation device 10 as in the first embodiment. In addition, as in the first embodiment, with the image data verification system according to the second embodiment, it is possible to reduce the cost of the image generation device 10.

In addition, with the image data verification system according to the second embodiment, it is possible to reliably confirm whether or not the image data in the image file with primary verification data or the image data in the image file with secondary verification data is the image data generated in the image generation device 10.

In addition, with the image data verification system according to the second embodiment, it is possible to operate securely the whole system because the primary verification data ensures the security from the image generation device 10 to the verification data converting device 20B, and the secondary verification data ensures the security from the verification data converting device 20B to the image verification device 30.

In addition, with the image data verification system according to the second embodiment, the security for the shared information Kc and secret information Ks can be enhanced by implementing the verification data converting device 20B retaining the shared information Kc and secret information Ks as a data processor with higher security such as an IC card or server computer, rather than a data processor such as a personal computer.

Figure 17:
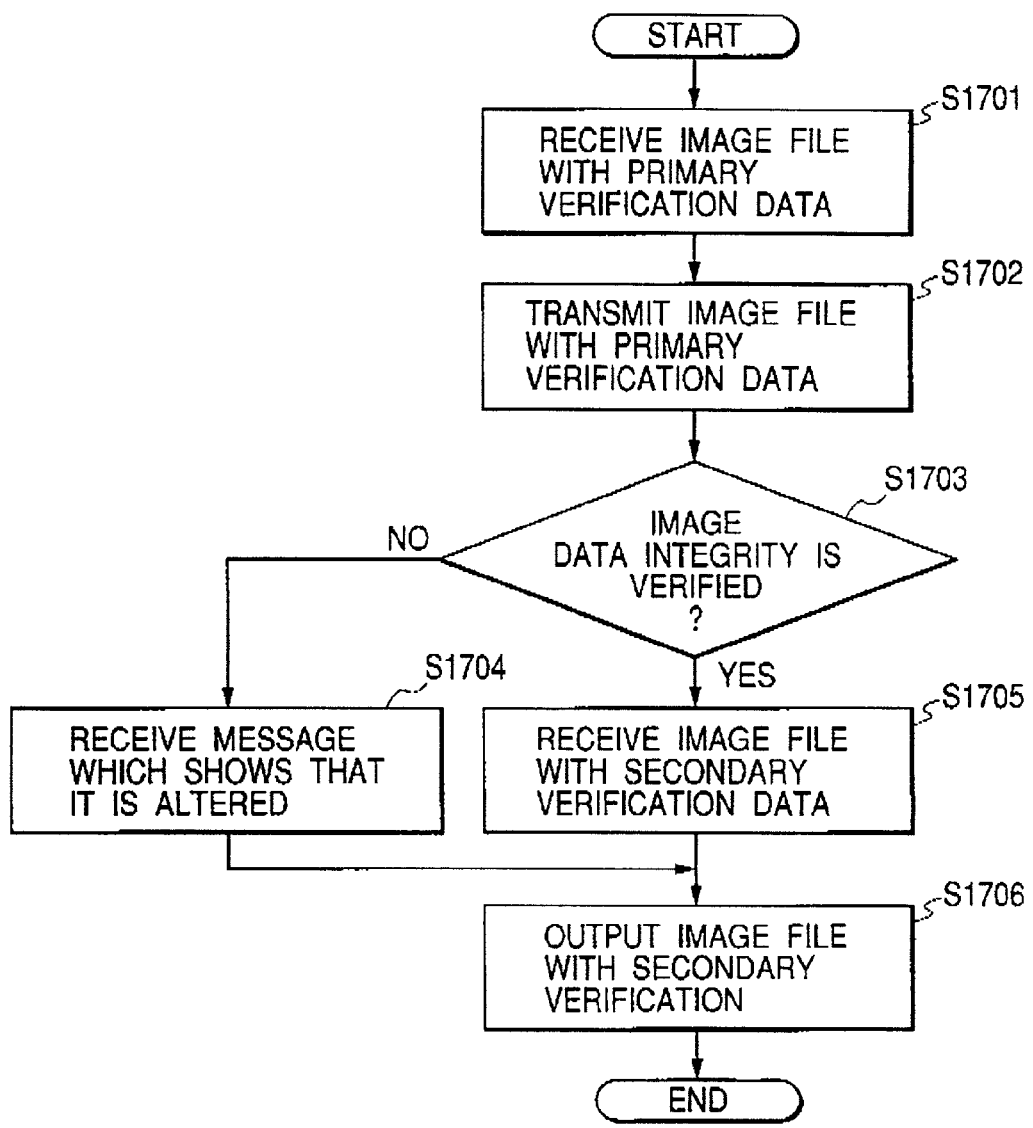
FIG. 17 is a flowchart showing a processing procedure of the verification data converting device 20A according to the second embodiment.

Next, with reference to FIG. 17, a processing procedure of the verification data converting device 20A according to the second embodiment will be described. The processing procedure shown in FIG. 17 is performed according to the program in the program memory 1426. The processing procedure shown in FIG. 17 is performed each time an image file with primary verification data is input.

Step S1701: The interface unit A 1423 receives the image file with primary verification data from the image generation device 10.

Step S1702: The interface unit B 1424 transmits the image file with primary verification data to the verification data converting device 20B.

Step S1703: If the verification data converting device 20B cannot verify the integrity in the image file with primary verification data, the process continues to step S1704. On the other hand, if the verification data converting device 20B can verify the integrity in the image file with primary verification data, the process continues to step S1705.

Step S1704: In this case, the interface unit B 1424 receives the message showing that the image data is altered. The control/calculation unit 1421 transmits to a user a message showing that the image data is altered.

Step S1705: In this case, the interface unit B 1424 receives the image file with secondary verification data.

Step S1706: The interface unit C 1428 outputs the image file with secondary verification data to a public network such as the Internet, or a removable medium (removable storage medium) such as a memory card.

Figure 18:
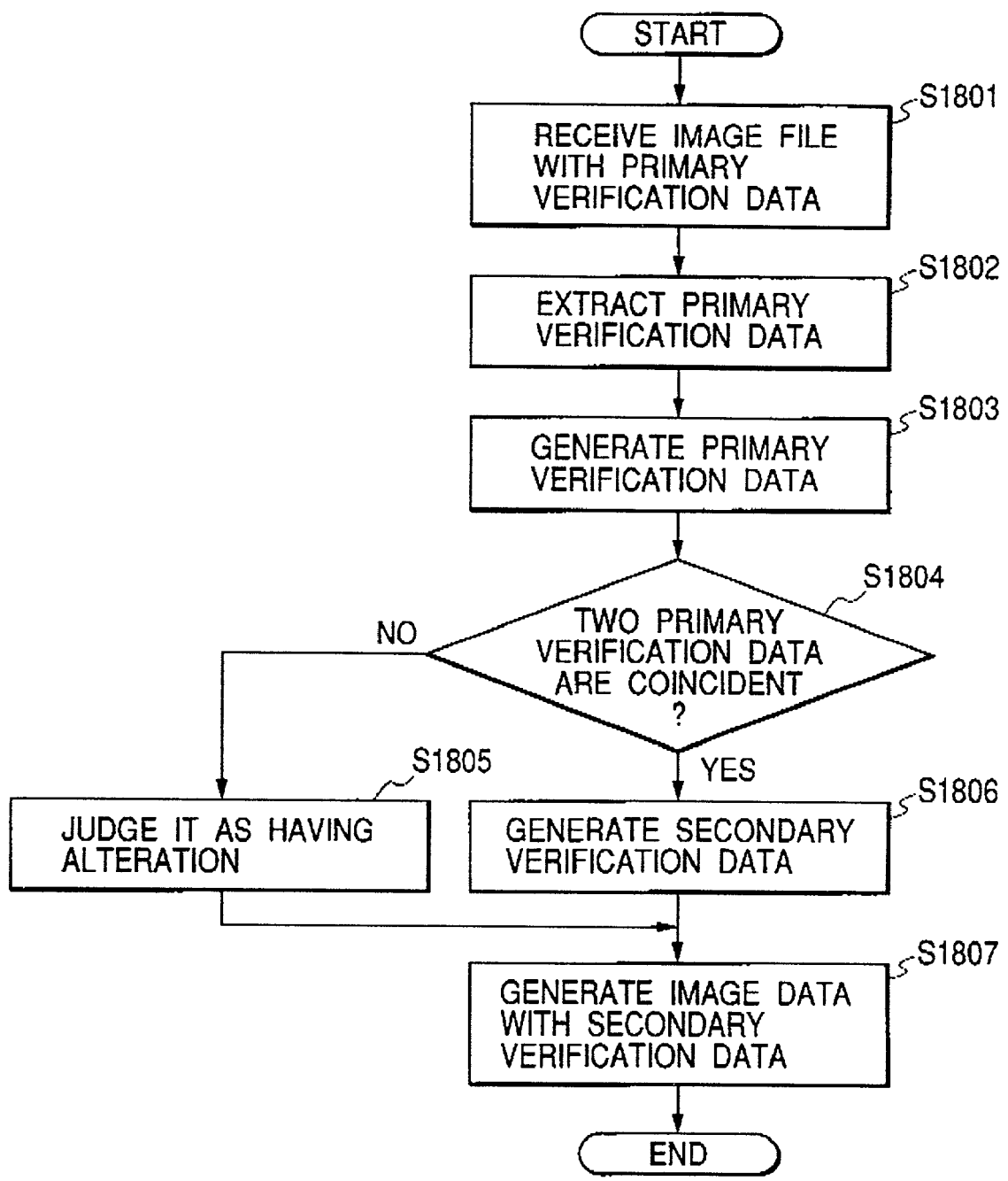
FIG. 18 is a flowchart showing a processing procedure of the verification data converting device 20B according to the second embodiment.

Next, with reference to FIG. 18, a processing procedure of the verification data converting device 20B according to the second embodiment will be described. The processing procedure shown in FIG. 18 is performed according to the verification program in the program memory 1526. The processing procedure shown in FIG. 18 is performed each time the image file with primary verification data is received.

Step S1801: The interface unit 1524 receives the image file with primary verification data from the verification data converting device 20A.

Step S1802: The control/calculation unit 1521 extracts the primary verification data from the header portion of the image file with primary verification data.

Step S1803: In addition, the control/calculation unit 1521 extracts the specific ID of the image generation device 10 from the header portion of the image file with primary verification data and image data from the data portion of the same file. The control/calculation unit 1521 detects the shared information Kc and secret information Ks corresponding to the extracted specific ID by referring to the table T1 in the program memory 1526. The control/calculation unit 1521 generates the primary verification data for the extracted image data from the image data and detected shared information Kc.

Step S1804: The control/calculation unit 1521 compares the primary verification data extracted in step S1802 (that is, primary verification data generated in the image generation device 10) with the primary verification data generated in step S1803 (that is, primary verification data generated in the verification data converting device 20B) to verify the integrity of the image data in the image file with primary verification data. If coincidence between two pieces of primary verification data is detected, the process continues to step S1806. On the other hand, if coincidence between two pieces of primary verification data is not detected, the process continues to step S1805.

Step S1805: In this case, the control/calculation unit 1521 determines that the image data is altered and transmits a message showing that the image data is altered to the verification data converting device 20A. In this case, the verification data converting device 20B inhibits generation of the secondary verification data.

Step S1806: In this case, the control/calculation unit 1521 generates the secondary verification data (that is, digital signature) from the image data in the image file with primary verification data.

Step S1807: The control/calculation unit 1521 replaces the primary verification data in the header portion of the image file with the generated secondary verification data to create the image file with secondary verification data. The created image file with secondary verification data is transmitted to the verification data converting device 20A.

Through the processing procedure described above, the verification data converting device 20B can reliably determine whether the image data generated by the image generation device 10 is altered or not without significantly enhancing the performance of the calculation resource of the image generation device 10, and therefore, the cost of the image generation device 10 can be reduced. In addition, the verification data converting device 20B can reliably confirm whether or not the image data in the image file with primary verification data is the image data generated in the image generation device 10. In addition, once the integrity of the image file with primary verification data is confirmed, it also can convert the image file into the image file with secondary verification data (that is, image file with a digital signature).

The invention may be embodied in other specific forms without departing from essential characteristics thereof.

Therefore, the above-described embodiments are merely exemplary of this invention, and are not be construed to limit the scope of the present invention.

The scope of the present invention is defined by the scope of the appended claims, and is not limited to only the specific descriptions in this specification. Furthermore, all the modifications and changes belonging to equivalents of the claims are considered to fall within the scope of the present invention.

What is claimed is:

1. An image verification system comprising an image generation device and a first image verification device,
   wherein said image generation device includes:
   (a) an image data generation unit which generates image data; and
   (b) a first verification data generation unit which generates first verification data from the image data using a common key in common key cryptography, and
   wherein said first image verification device includes:
   (a) a first verification unit which verifies, using the image data, the first verification data and the common key, whether the image data is altered; and
   (b) a second verification data generation unit which generates second verification data from the image data using a private key in public key cryptography without editing the image data, if the first verification unit verifies that the image data is not altered.

2. The image verification system according to claim 1, wherein the first verification data generation unit generates the first verification data from the image data using the common key and a first hash function, and
   wherein the second verification data generation unit generates the second verification data from the image data using the private key and a second hash function.

3. The image verification system according to claim 1, wherein the second verification data generation unit disables generation of the second verification data, if the first verification unit verifies that the image data is altered.

4. The image verification system according to claim 1, wherein the first image verification device includes a memory storing both the common key and the private key.

5. The image verification system according to claim 1, further comprising a second image verification device,
   wherein said second image verification device includes a second verification unit adapted to verify, using the image data, the second verification data and a public key corresponding to the private key, whether the image data is altered.

6. The image verification system according to claim 5, wherein said second image verification device is a server computer and said first image verification device is a client of the server computer.

7. The image verification system according to claim 5, wherein the first verification data generation unit generates the first verification data from the image data using the common key and a first hash function, and
   wherein the second verification data generation unit generates the second verification data from the image data using the private key and a second hash function.

8. The image verification system according to claim 1, wherein said image generation device is one of a digital camera, a digital camcorder and a scanner.

9. An image verification system comprising:
   an image generation device;
   a first image verification device; and
   a connection device which is connected to said image generation device and said first image verification device,
   wherein said image generation device includes:
   (a) an image data generation unit which generates image data; and
   (b) a first verification data generation unit which generates first verification data from the image data using a common key in common key cryptography,
   wherein said connection device provides the image data and said first verification data to said first image verification device, and
   wherein said first image verification device includes:
   (a) a first verification unit which verifies, using the image data, the first verification data and the common key, whether the image data is altered; and
   (b) a second verification data generation unit which generates second verification data from the image data using a private key in public key cryptography without editing the image data, if the first verification unit verifies that the image data is not altered.

10. The image verification system according to claim 9, wherein the first verification data generation unit generates the first verification data from the image data using the common key and a first hash function, and
    wherein the second verification data generation unit generates the second verification data from the image data using the the private key a second hash function.

11. The image verification system according to claim 9, wherein the second verification data generation unit disables generation of the second verification data, if the first verification unit verifies that the image data is altered.

12. The image verification system according to claim 9, wherein said first image verification device includes a memory storing both the common key and the private key.

13. The image verification system according to claim 9, wherein said first image verification device is an IC card or a storage medium with a microprocessor.

14. The image verification system according to claim 9, wherein said first image verification device is a server computer and said connection device is a client of the server computer.

15. The image verification system according to claim 9, further comprising a second image verification device,
    wherein said second image verification device includes a second verification unit adapted to verify, using the image data, the second verification data and a public key corresponding to the private key, whether the image data is altered.

16. The image verification system according to claim 15, wherein said second image verification device is a server computer and said connection device is a client of the server computer.

17. The image verification system according to claim 15, wherein the first verification data generation unit generates the first verification data from the image data using the common key and a first hash function, and
    wherein the second verification data generation unit generates the second verification data from the image data using the private key and a second hash function.

18. The image verification system according to claim 9, wherein said image generation device is one of a digital camera, a digital camcorder and a scanner.

19. An image verification device comprising:
a verification unit which verifies, using image data, first verification data and a common key in common key cryptography, whether the image data is altered, the image data and the first verification data being generated in an image generation device, and the first verification data being generated from the image data using the common key; and
a verification data generation unit which generates second verification data from the image data using a private key in public key cryptography without editing the image data, if said verification unit verifies that the image data is not altered.

20. The image verification device according to claim 19, wherein the first verification data is generated from the image data using the common key and a first hash function, and
wherein said verification data generation unit generates the second verification data from the image data using the private key and a second hash function.

21. The image verification device according to claim 19, wherein said verification data generation unit disables generation of the second verification data, if said verification unit verifies that the image data is altered.

22. The image verification device according to claim 19, wherein the image verification device includes a memory storing both the common key and the private key.

23. An image verification method comprising the steps of:
verifying, using image data, first verification data and a common key in common key cryptography, whether the image data is altered or not, the image data and the first verification data being generated in an image generation device, and the first verification data being generated from the image data using the common key; and
generating second verification data from the image data using a private key in public key cryptography without editing the image data, if it is verified in said verifying step that the image data is not altered.

24. The image verification method according to claim 23, wherein the first verification data is generated from the image data using the common key and a first hash function, and
wherein the second verification data is generated from the image data using the public key and a second hash function.

25. The image verification method according to claim 23, further comprising the step of:
disabling generation of the second verification data, if it is verified in said verification step that the image data is altered.

26. A computer-readable medium storing a program for implementing the image verification method according to any one of claims 23 to 25.

* * * * *